United States Patent
Sonneman et al.

(10) Patent No.: US 10,670,242 B2
(45) Date of Patent: Jun. 2, 2020

(54) LUMINAIRE WITH MOVEABLE AND DETACHABLE LAMP HEAD

(71) Applicant: Contemporary Visions, LLC, Larchmont, NY (US)

(72) Inventors: Robert A. Sonneman, Mamaroneck, NY (US); Christian Garnett, Mount Kisco, NY (US)

(73) Assignee: Contemporary Visions, LLC, Larchmont, NY (US)

( * ) Notice: Subject to any disclaimer, the term of this patent is extended or adjusted under 35 U.S.C. 154(b) by 0 days.

(21) Appl. No.: 16/201,190

(22) Filed: Nov. 27, 2018

(65) Prior Publication Data

US 2019/0162396 A1  May 30, 2019

Related U.S. Application Data

(60) Provisional application No. 62/591,455, filed on Nov. 28, 2017.

(51) Int. Cl.

| | |
|---|---|
| *F21V 21/096* | (2006.01) |
| *F21V 21/10* | (2006.01) |
| *F21V 23/00* | (2015.01) |
| *F21S 8/00* | (2006.01) |
| *F21V 21/14* | (2006.01) |
| *F21V 8/00* | (2006.01) |
| *F21V 21/22* | (2006.01) |
| *F21S 6/00* | (2006.01) |
| *F21V 21/30* | (2006.01) |
| *F21V 27/00* | (2006.01) |
| *F21V 21/116* | (2006.01) |
| *F21Y 115/10* | (2016.01) |
| *F21V 21/29* | (2006.01) |
| *F21Y 103/33* | (2016.01) |

(52) U.S. Cl.
CPC ............ *F21V 21/096* (2013.01); *F21S 6/006* (2013.01); *F21S 8/036* (2013.01); *F21V 21/10* (2013.01); *F21V 21/116* (2013.01); *F21V 21/22* (2013.01); *F21V 21/30* (2013.01); *F21V 23/002* (2013.01); *F21V 27/00* (2013.01); *G02B 6/0051* (2013.01); *F21V 21/29* (2013.01); *F21Y 2103/33* (2016.08); *F21Y 2115/10* (2016.08)

(58) Field of Classification Search
CPC ........ F21V 21/10; F21V 21/22; F21V 23/002; F21V 21/096; F21V 21/116; F21V 21/30; F21V 21/29; F21V 27/00; G02B 6/0051; G02B 6/0011; F21S 8/036; F21S 6/006
See application file for complete search history.

(56) References Cited

U.S. PATENT DOCUMENTS

| | | |
|---|---|---|
| 3,413,459 A | 11/1968 | Sonneman |
| 3,694,647 A | 9/1972 | Chapman, Jr. et al. |

(Continued)

FOREIGN PATENT DOCUMENTS

| | | |
|---|---|---|
| CN | 206582543 U | 10/2017 |
| DE | 10 2010 020 819 A1 | 12/2010 |
| WO | 2013/091116 A1 | 6/2013 |

*Primary Examiner* — Arman B Fallahkhair
(74) *Attorney, Agent, or Firm* — Gottlieb Rackman & Reisman PC

(57) ABSTRACT

A luminaire that includes a lamp head that is magnetically connectable to a support, is configured to rotate to any desired angle or orientation and is detachable from the support to allow for the lamp head to be a hand-held light.

15 Claims, 12 Drawing Sheets

(56) References Cited

U.S. PATENT DOCUMENTS

| | | | | |
|---|---|---|---|---|
| 4,533,982 | A * | 8/1985 | Kozar | F21V 23/0414 |
| | | | | 362/183 |
| 4,719,549 | A * | 1/1988 | Apel | F21S 2/00 |
| | | | | 362/398 |
| 7,249,864 | B2 * | 7/2007 | Smith | F21L 4/085 |
| | | | | 362/183 |
| 8,721,124 | B2 * | 5/2014 | Byrne | F21V 21/22 |
| | | | | 362/285 |
| 8,900,009 | B2 * | 12/2014 | Hornick | H01R 13/73 |
| | | | | 439/571 |
| 8,979,305 | B2 * | 3/2015 | Sachsenweger | F21V 21/096 |
| | | | | 362/249.01 |
| 9,097,415 | B2 * | 8/2015 | Snijder | F21S 6/002 |
| 9,729,791 | B2 * | 8/2017 | Huerta | H04N 5/23241 |
| 2010/0027293 | A1 * | 2/2010 | Li | G02B 6/002 |
| | | | | 362/619 |
| 2017/0211787 | A1 | 7/2017 | Sattler | |

* cited by examiner

LUMINAIRE WITH MOVEABLE AND DETACHABLE LAMP HEAD

CROSS-REFERENCE TO RELATED APPLICATION

This application claims priority to U.S. Provisional Patent Application No. 62/591,455, filed Nov. 28, 2017, the contents of which are incorporated herein by reference in its entirety.

FIELD OF THE INVENTION

The present disclosure relates generally to a luminaire and more specifically to a luminaire that includes a moveable and detachable lamp head.

BACKGROUND OF THE INVENTION

Various luminaire configurations, including those that are wall mounted, floor or table supported and suspended exist. Typically, if the luminaire includes a lamp head, the lamp head is permanently fixed to a body (e.g., support, post or a component(s) thereof at a specific orientation or the lamp head can be movable (e.g., at an angle or rotated). However, current luminaire designs do not offer adjustability (i.e., height and orientation) of a support and/or light post combined with freedom of movement of a lamp head to rotate to any desired position and for the lamp head to be detachable to allow for the lamp head to be a hand-held light.

SUMMARY OF THE INVENTION

In general, the present disclosure is directed to a luminaire that includes a lamp head that is magnetically connectable to a support, is configured to rotate to any desired angle or orientation and is detachable from the support to allow for the lamp head to be a hand-held light.

According to an exemplary embodiment, the present disclosure is directed to a lighting system that includes a support, a spherical element that is fixed to a distal end of the support and a lamp head that is rotatably connectable to the spherical element. In an embodiment, the lamp head can be magnetically connectable to the spherical element, which can be, for example, comprised of steel. The support can be an armature that extends at an angle from the spherical element.

The lighting system can include a pedestal that is delimited at a first end and a second end with the support fixed to and extending from the first end of the pedestal. The pedestal includes a plurality of longitudinally extending posts, including a first post and a second post with the second post configured to be arranged within the first post and telescopically extend from the first post and retract within the second post. In an embodiment, the lighting system can further include a base that is configured to support the lighting system about a surface with the second end of the pedestal fixed to the base. Alternatively, the lighting system can include a mounting bracket that is configured to secure the lighting system to a surface.

An electric cord can extend from the support to the lamp head such that when the cord is connected to a power source, the cord can transmit power to the lamp head to allow light to be emitted therefrom.

The lamp head can be comprised of a housing that includes a first housing element and a second housing element that are configured to be secured to each other. A magnet, which can, for example, be rare earth ring magnet, can be arranged within the lamp head that is configured to interact with the spherical element to releasably magnetically connect the support and lamp head. The magnet can include a concave portion that configured to mate with the spherical element.

A cup-shaped component can be arranged within the housing and configured to be contactable with the spherical element. The cup-shaped component can include a housing that has a first surface and a second surface and a plurality of bosses and a plurality of fasteners that extend from the housing. The plurality of bosses and the plurality of fasteners can extend in a same direction and the plurality of bosses and the plurality of fastener can be arranged such that the plurality of bosses and the plurality of fastener are interdisposed between each other. The plurality of fasteners, which can be snap hooks, can be adaptable to secure the magnet to the cup-shaped component.

The lighting system can include a flexible circuit board to which a plurality of light-emitting diodes are fixed and arranged within the lamp head. The flexible circuit board can extend about an inner periphery of the lamp head with the plurality of light-emitting diodes projecting toward a center of the lamp head. The lighting system can further include a guide plate and a diffuser through which light from the light-emitting diodes projects.

DETAILED DESCRIPTION OF EMBODIMENTS OF THE INVENTION

Figure 1:
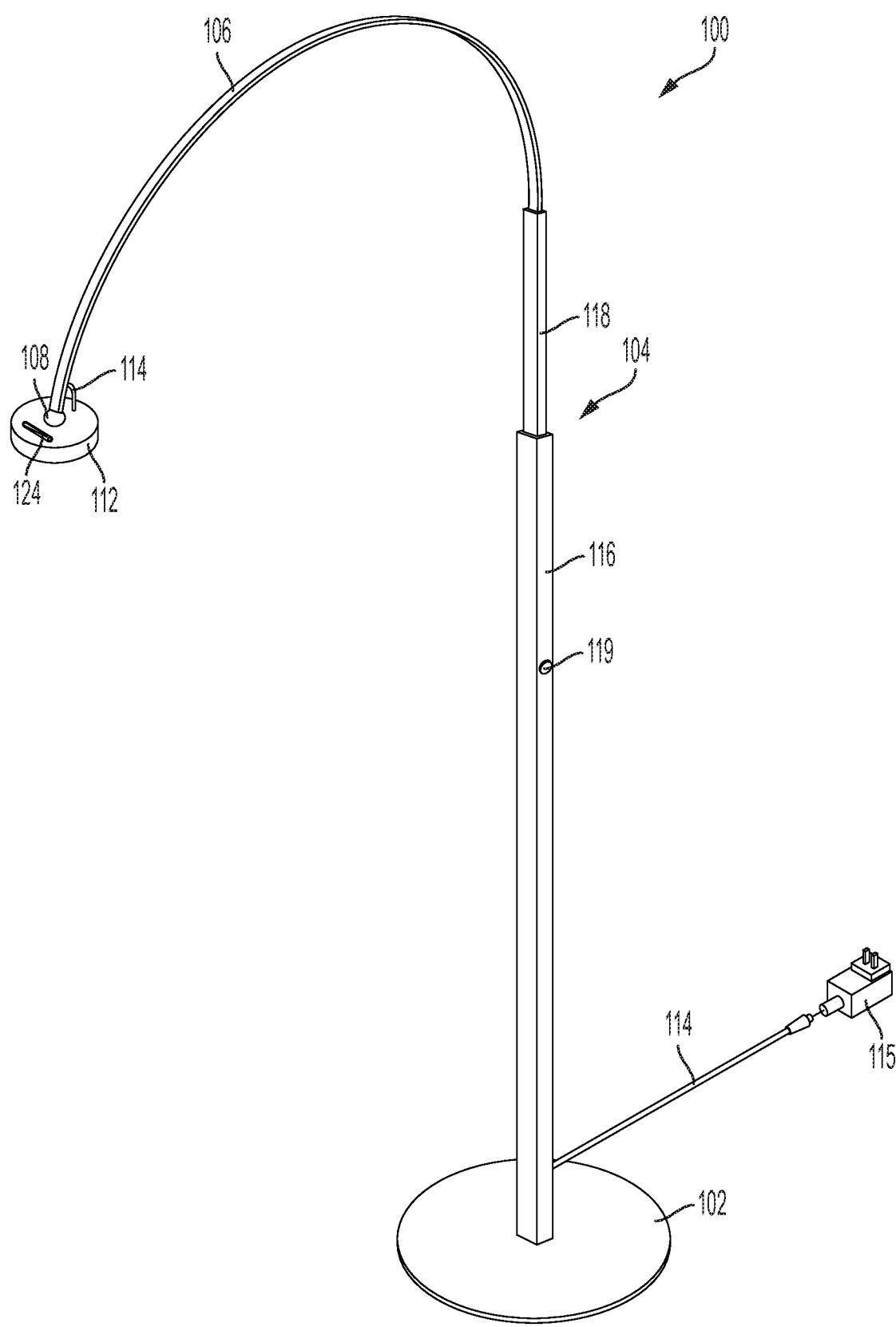
FIG. 1 is a first perspective view of a luminaire that includes a moveable and detachable lamp head according to an exemplary embodiment of the present invention.

With reference now to the drawings, and in particular to FIGS. 1 through 13, embodiments of luminaires of the present disclosure, which are designated generally by reference numerals 100 and 200 will be described.

Figure 2:
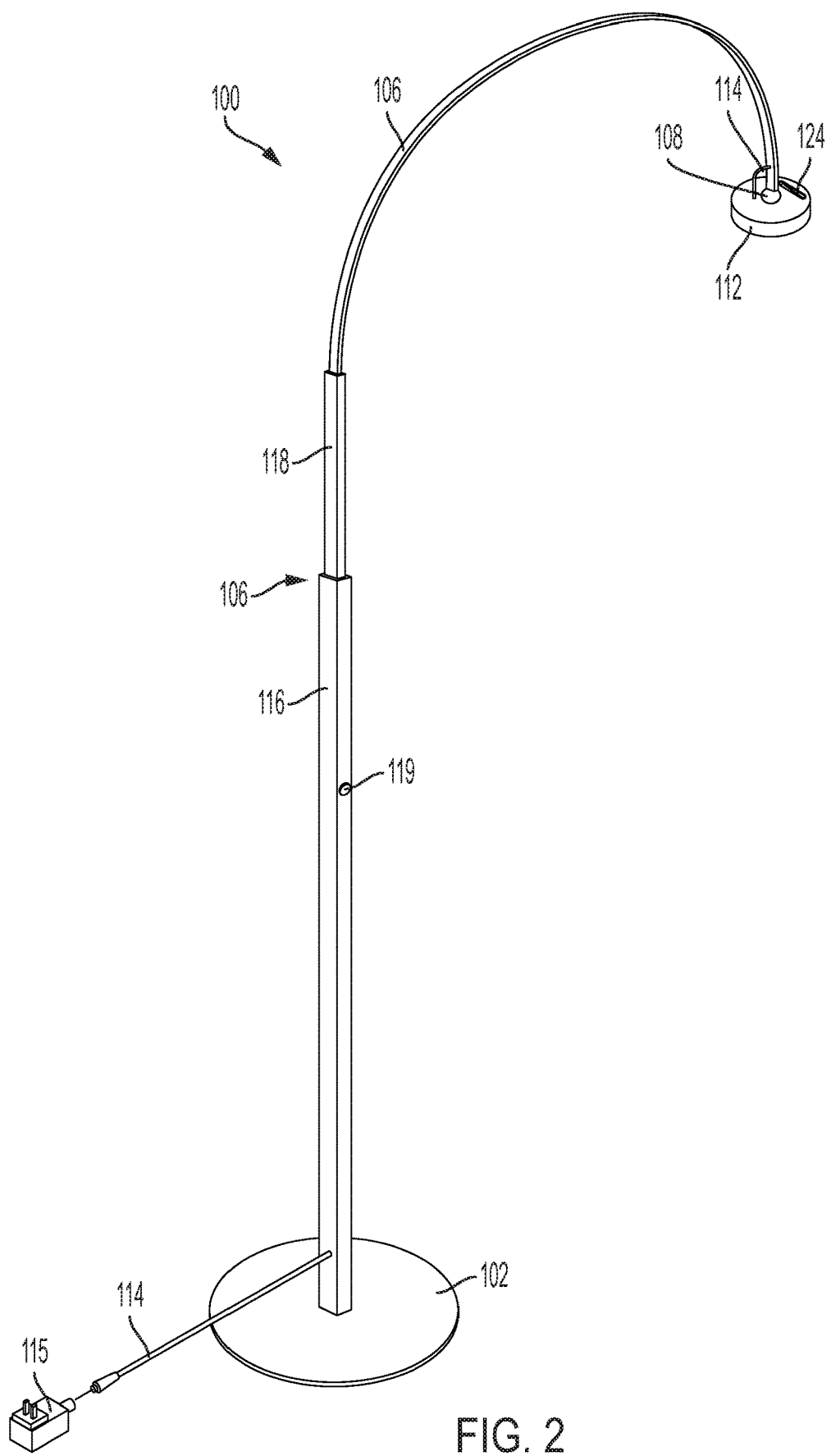
FIG. 2 is a second perspective view of the luminaire of FIG. 1.

FIGS. 1-6 illustrate a luminaire 100 according to an exemplary embodiment of the present invention. As shown in FIGS. 1 and 2, the luminaire 100 generally includes a base 102, a pedestal 104 that is fixed to the base 102 at a first end, a support or armature 106, which extends in an arc and can be flexible, is fixed to and extends at a first end thereof at an angle from a second end of the pedestal 104, a spherical element 108 that is fixed to a second end of the armature 106, a lamp head 112 that is configured to receive the spherical element 108 and connect the lamp head 112 to the armature 106 and an electrical cord 114 that is fixed to the lamp head 112 and extends through an aperture 113 (see FIG. 5) in the armature 108 and internally within the armature 106 and the pedestal 104 and out of an opening near the first end of the pedestal 104 to an A/C connector 115 that can be inserted into an electrical outlet (not shown). The spherical element 108 can, for example, be metallic, elastomeric or at least semi-elastomeric (e.g., rubberized coating). It is noted that although a spherical element 108 is shown, an element having another shape that allows for unrestricted rotation, angularity and detachability can be used.

The pedestal 104 is configured to be telescopically extendable and/or retractable to accommodate a variety of desired heights. As shown, the pedestal 104 includes a plurality of tiers, including a first tier 116 that has a first width and a second tier 118 that has a second width that is less that the width of the first tier 116. The height of the second tier 118 can be adjusted, for example, by a tensionable fastener 119 that allows the pedestal 104 to be extended or retracted to a desired height. Although the tiers 116, 118 are shown as being rectangular, the shape, width and configuration of the pedestal 104 can be of any known shape, width and/or configuration that is or may become known. For example, the pedestal 104 can include a plurality of cylindrical tiers of decreasing diameters, a single rectangular tier or a single cylindrical tier.

Figure 3:
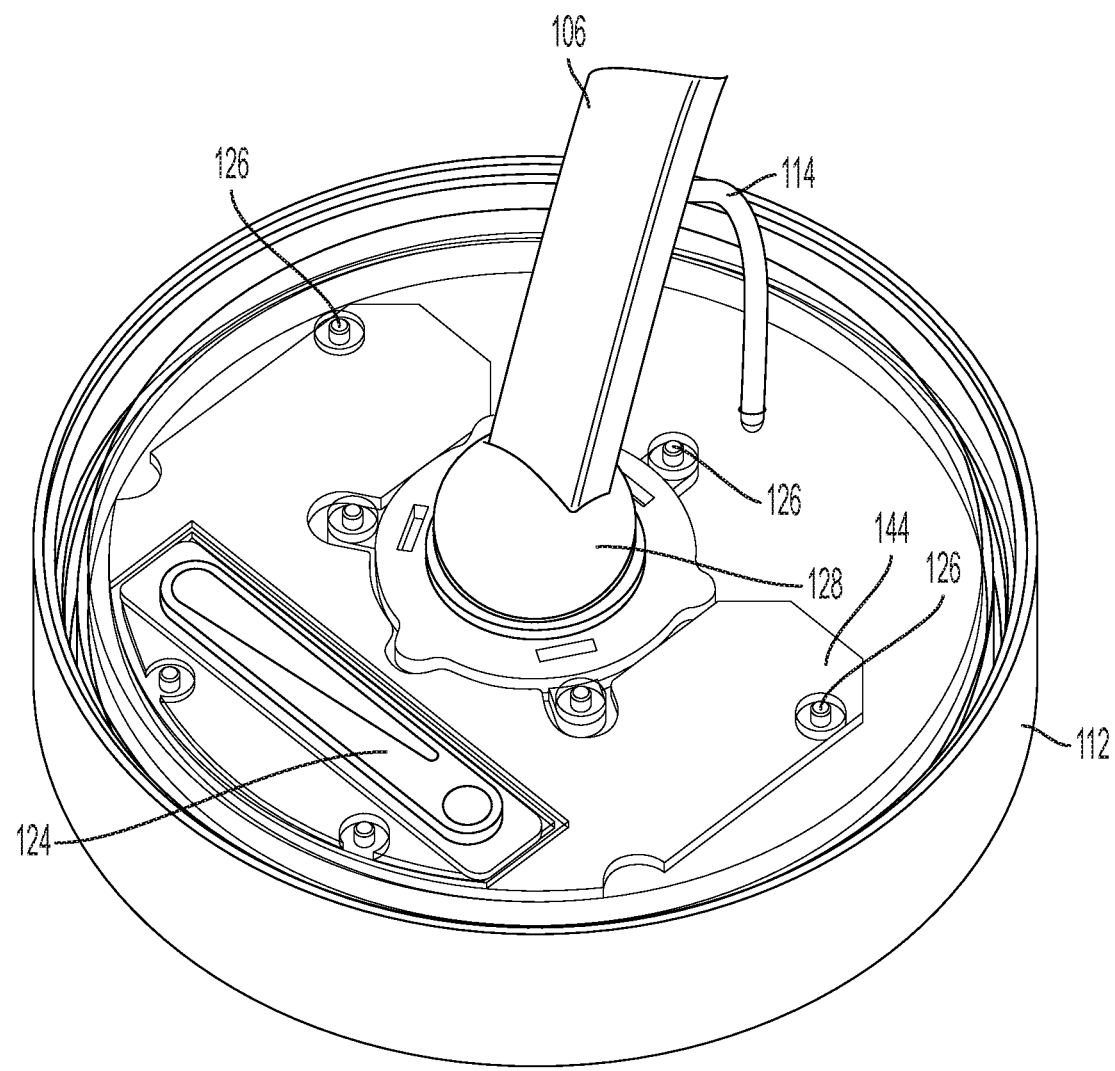
FIG. 3 is a top perspective view of a lamp head of a luminaire with the covering removed according to an exemplary embodiment of the present invention.
Figure 4:
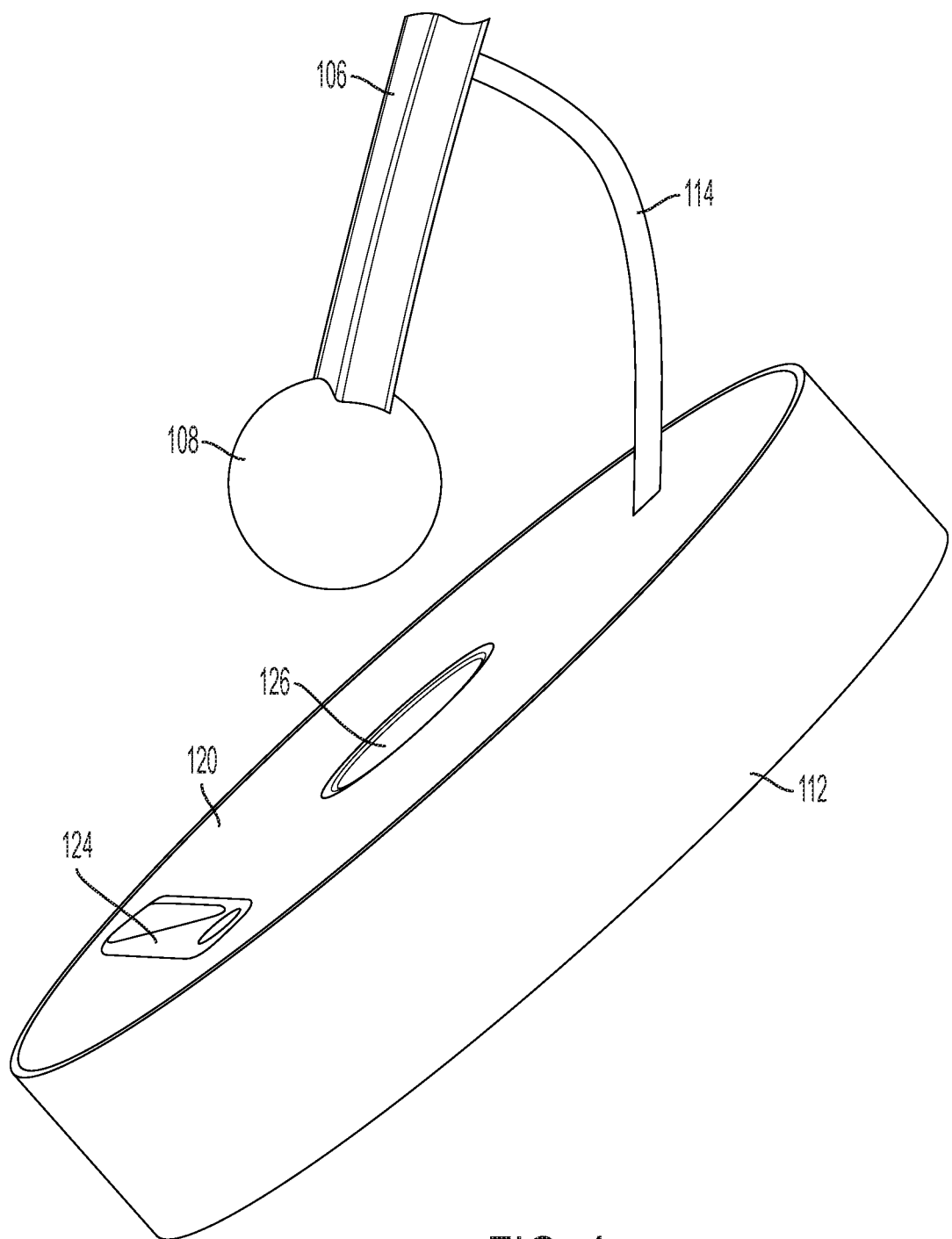
FIG. 4 is another perspective view of a luminaire showing a lamp head and a sphere that is fixed to the armature of the luminaire separated from the head according to an exemplary embodiment of the present invention.

FIG. 3 depicts the lamp head 112 with a portion of a housing 120 removed and FIG. 4 depicts the lamp head 112 with the housing 120 sealing the top portion of the lamp head 112 from the environment. The lamp head 112 includes a control 124 (e.g., slideable switch, toggle switch, button, etc.) that can be adapted to turn the light source 122 on and off or allow for a reduced transmission of light (e.g., touch dimming feature) to emit from the lamp head 112 and a connection apparatus 126 that is fixable to the housing 120 by at least one fastener 126. As shown in FIG. 3, the spherical element 108 is seated on the connection apparatus 128 and as shown in FIG. 4, the spherical element 108 is detached from the connection apparatus 128.

Figure 5:
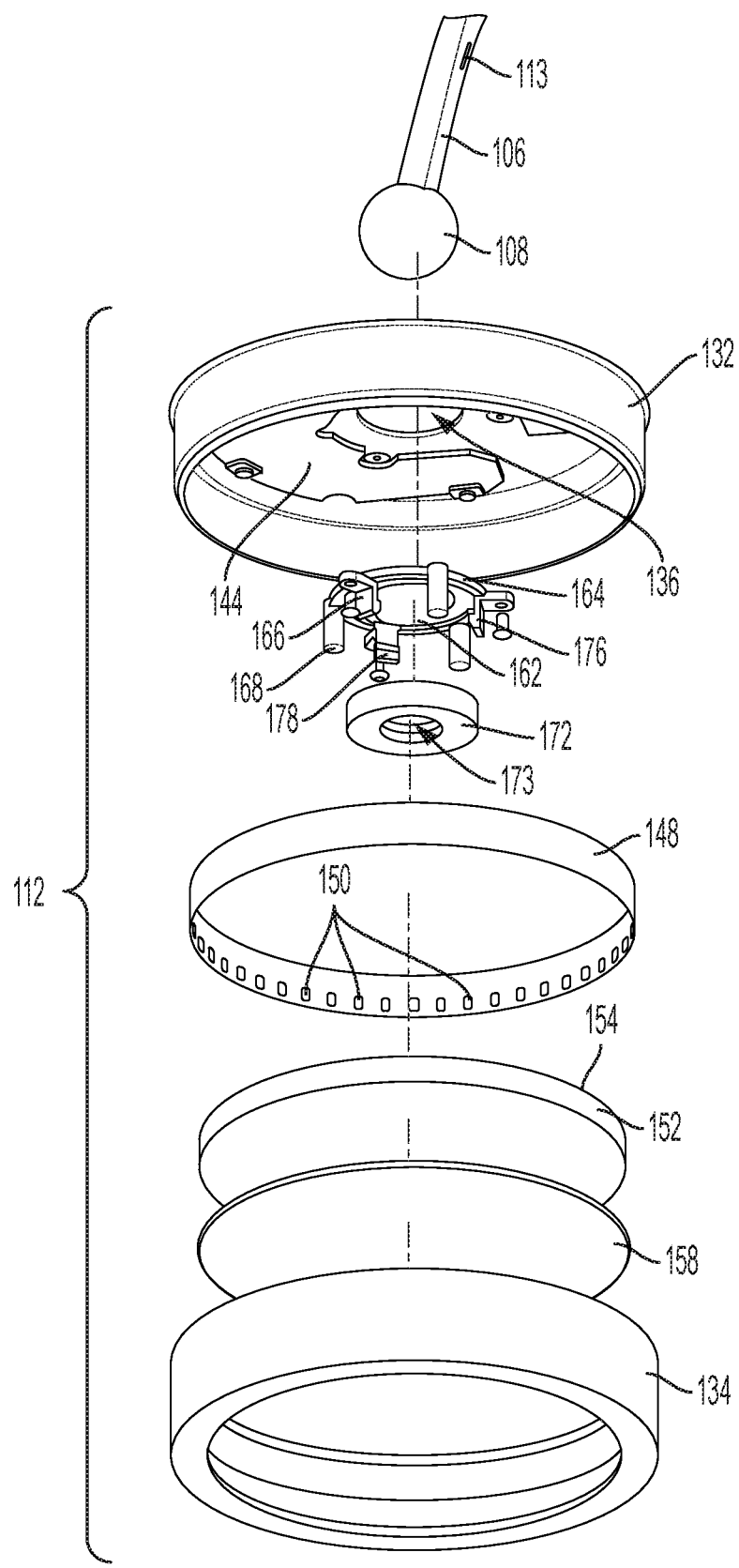
FIG. 5 is an exploded view of a lamp head, a sphere and an armature of a luminaire according to an exemplary embodiment of the present invention.
Figure 6:
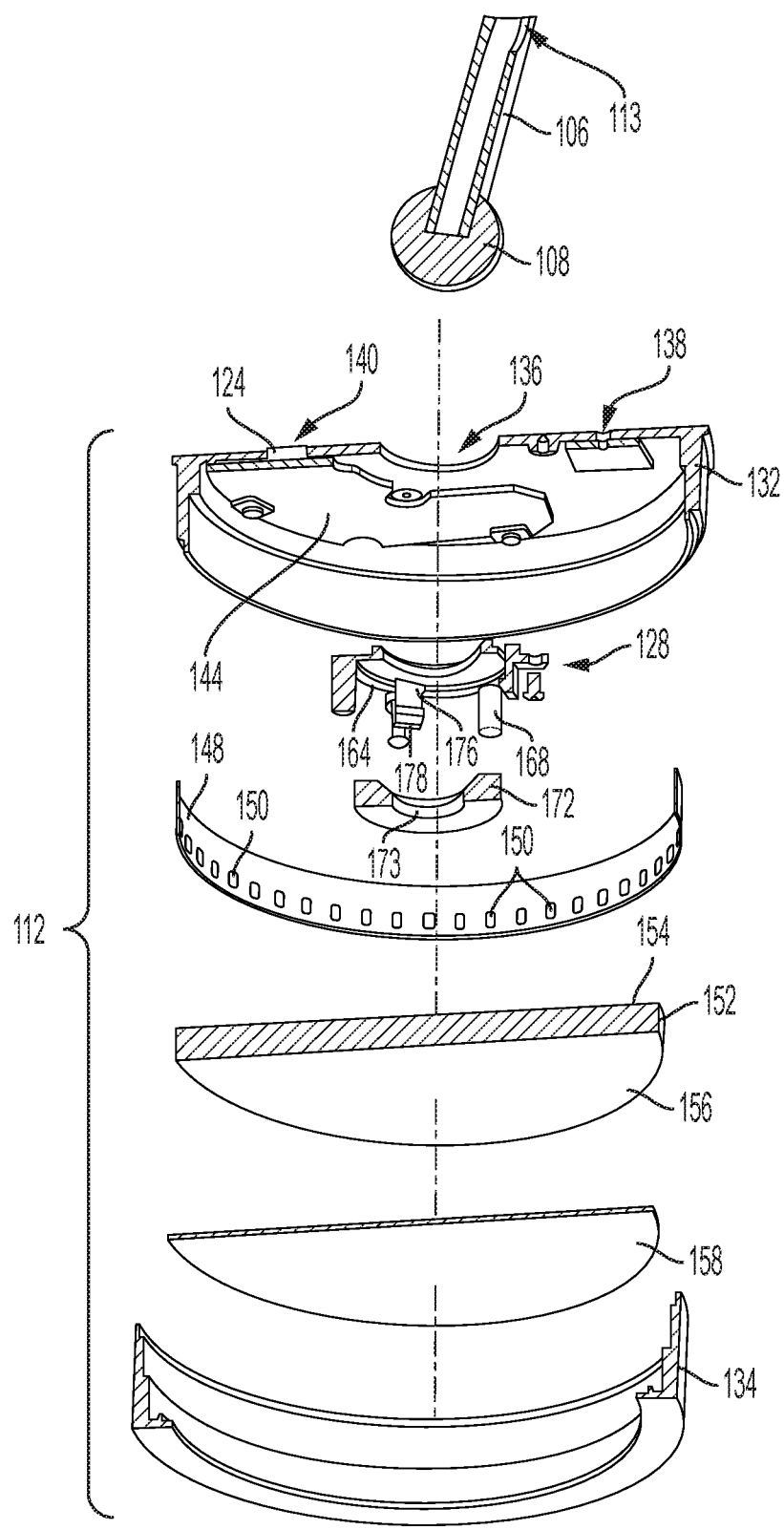
FIG. 6 is an exploded cross-sectional view of FIG. 5.
Figure 7:
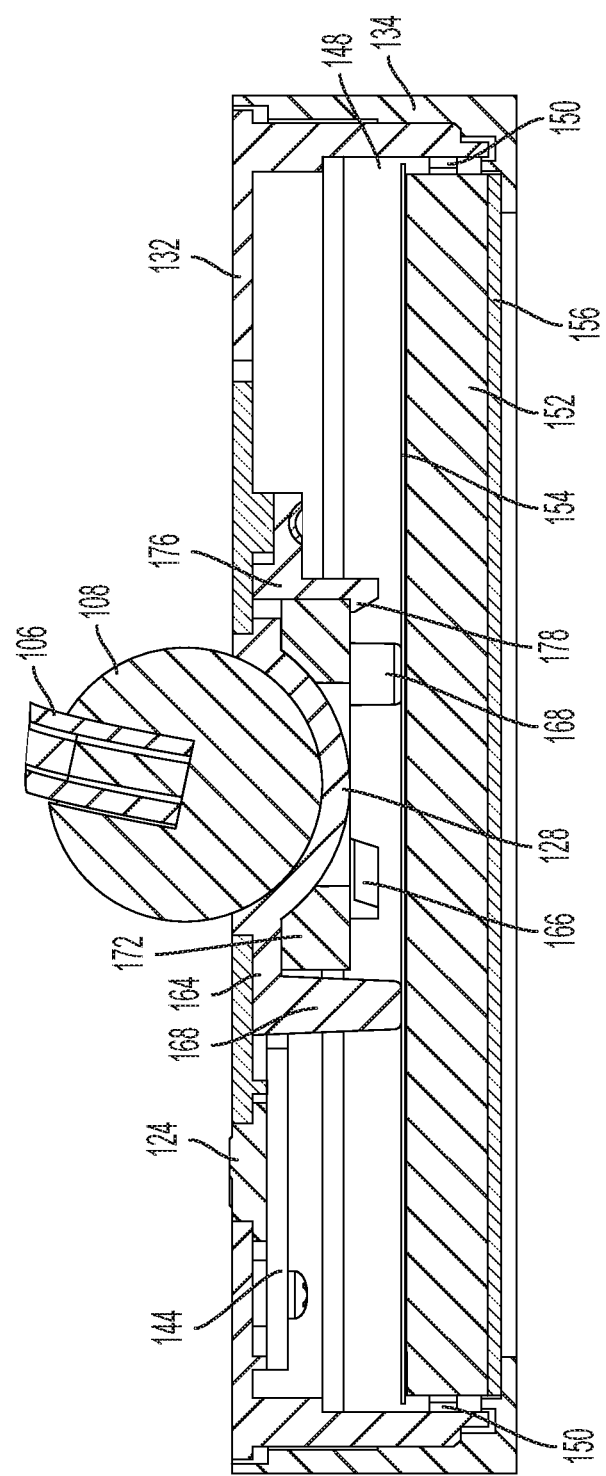
FIG. 7 is a cross-sectional view of a lamp head interacting with a sphere that is fixed to an armature of a luminaire to allow for movement of a lamp head according to an exemplary embodiment of the present invention.

FIGS. 5 and 6 depict an exploded and partially exploded view, respectively, of the lamp head 112 with the armature 106 and spherical element 108 spaced from the lamp head 112. As shown, the lamp head 112 includes a housing 130 that is comprised of a first housing member 132 and a second housing member 134 in which the first housing member 132 is arranged. The first housing member 132 can be coupled or fixed to the second housing member 134 to ensure that the elements of the luminaire 100 arranged within the housing 130 are secured therein. For example, in an embodiment, the first and second housings 132, 134 can include mating threading (e.g., first housing 132 can include male threading and second housing 134 can include female threading) to releasably fix the housings 132, 134 to each other. Alternatively, the housings 132, 134, for example, can be press fit or secured to each other by an adhesive.

The first housing 132 includes a first aperture 136 in which the spherical element 108 can be received, a second aperture 138 through which the electrical cord 114 can extend and a third aperture 140 through which the control 124 can project outwardly. Additionally, a printed circuit board 144 that is configured to control light-emitting diodes (LEDs) is connectable to an inner surface 146 of the first housing 132 by at least one fastener 126 and a flexible printed circuit board 148 with a plurality of LEDs 150 arranged thereon is arranged within the first housing 132 and extends about an inner periphery of the first housing 132. As shown, the printed circuit board 148 and the LEDs 150 extend in a ring about the inside of the housing 130 with the LEDs 150 oriented to project light inwardly toward a center of the housing 130. However, the printed circuit board 148 and the LEDs 150 can be configured to extend about only a portion or portions of the housing 130. For example, the circuit board 148 and the associated LEDs 150 can extend about half of the inner periphery of the first housing 132 or about a plurality of portions of the inner periphery of the first housing 132 that are spaced from each other.

A light guide plate 152 is arranged within the housing 130 and concentric with the circuit board 150 and the plurality of LEDs 150 such that the LEDs 150 emit light toward the outer periphery of the light guide plate 152, illuminating the edge of the light guide plate 152. The light guide plate 152 includes a reflective top surface 154 to aid in directing light toward a bottom surface 156 and through a diffuser 158, which is arranged adjacent to the bottom surface 156 of the light guide plate 152 and into the environment to illuminate a space. The diffuser can include a plurality of layers of film to diffuse light.

As can be seen in FIG. 6, the connection apparatus 128, which can be, for example, comprised of a synthetic material such as plastic, is arranged within the first opening 136 of the first housing 132. As depicted in FIGS. 5-8, the connection apparatus 128 is comprised of a housing 160 that includes a substantially semi-circular bowl-shaped element 162, a rim 164 that extends outwardly from the substantially semi-circular bowl-shaped portion 162, plurality of first projections 166 that are spaced from each other and extend in a first direction from the rim 164 and a plurality of second projections 168 that are spaced from each other, extend in the first direction from the rim 164 and are interdisposed between the first projections 166. A shown, the plurality of first projections 166 are hook clips and the plurality of second projections 168 are cylindrically extending posts.

To releasably fix the spherical element 108 to a first surface 170 of the connection apparatus 128 within the lamp 123, at least one magnet 172 is arranged to be in contact with and at least substantially encompass a second surface 174 of connection apparatus 128. As shown, the magnetic element has a concave surface with an opening 173 extending therethrough. In an embodiment, the magnet 172 can be a rare earth ring magnet configured to create a Gaussian magnetic effect to attract the spherical element 108 and hold the sphere 108 in the connection apparatus 128. To aid in securing the magnet 172 within the housing 130 and in contact with the connection apparatus 128, the magnet 172 is arranged between the first projections 166, which each include a leg 176 and a flange 178 on which a portion of the magnet 172 is seated. The second projections 168 are designed to aid in securing the light guide plate 152 in place within the housing 130, away from the magnet 172.

Figure 8:
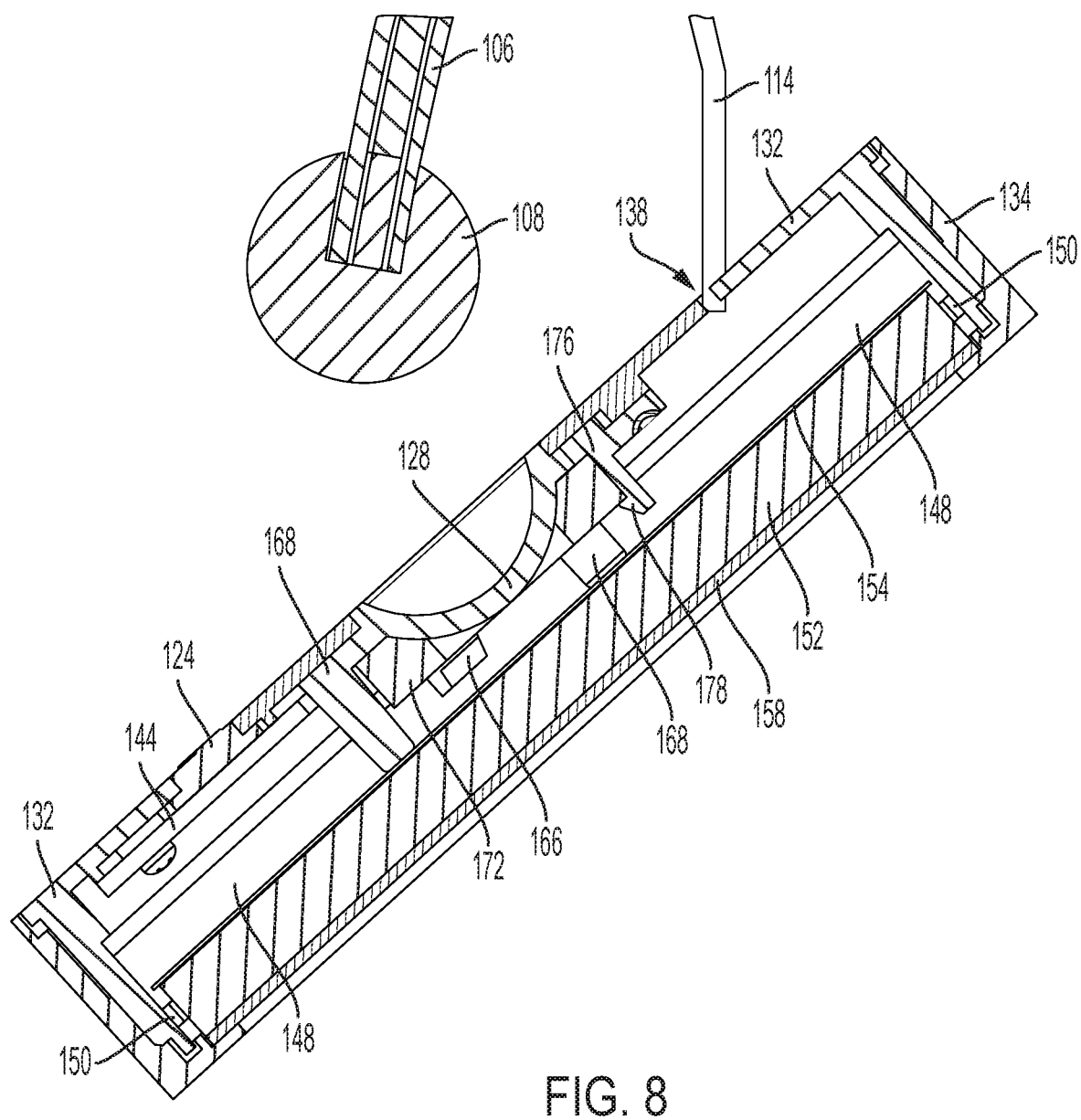
FIG. 8 is a partial perspective view of FIG. 4 showing a lamp head and the sphere that is fixed to the armature of the luminaire separated from the head according to an exemplary embodiment of the present invention.
Figure 9:
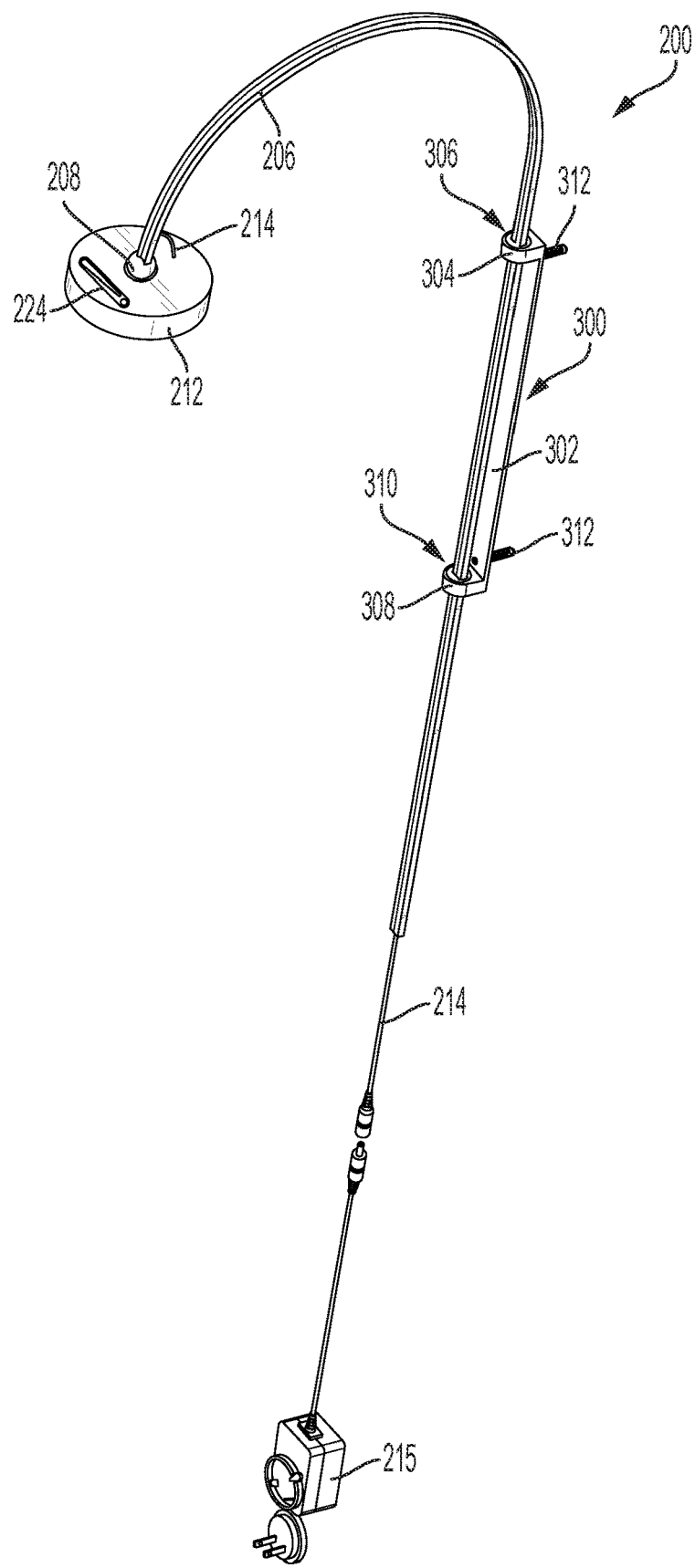
FIG. 9 is a perspective view of another luminaire that includes a moveable and detachable lamp head according to an exemplary embodiment of the present invention.
Figure 10:
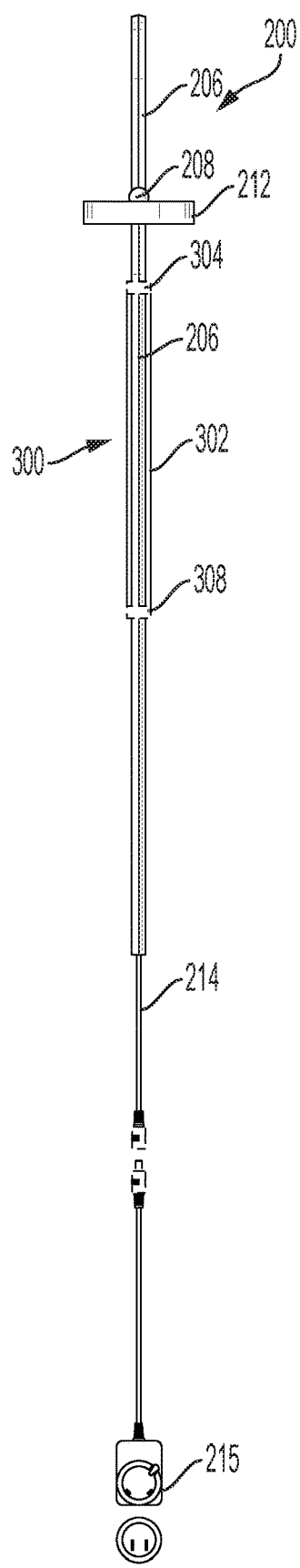
FIG. 10 is a front elevation view of the luminaire of FIG. 9.
Figure 11:
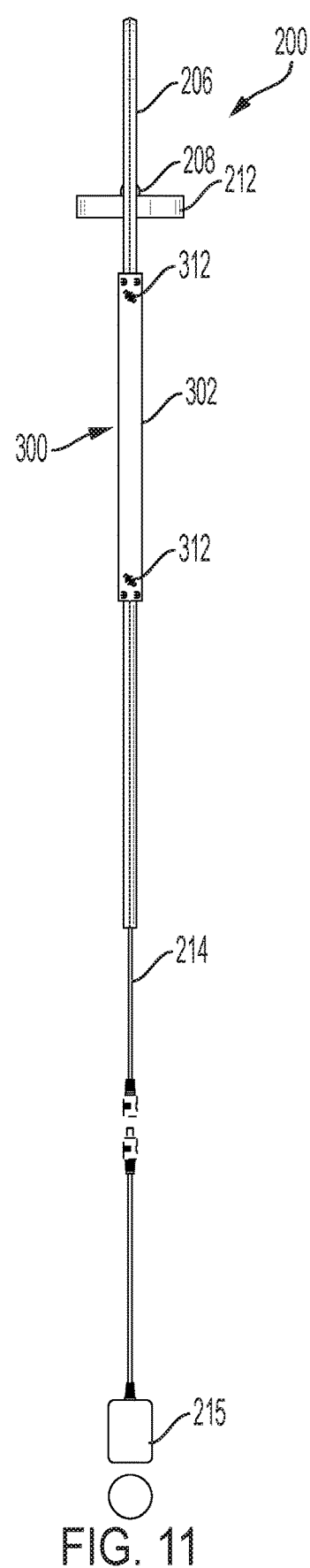
FIG. 11 is a rear elevation view of the luminaire of FIG. 9.
Figure 12:
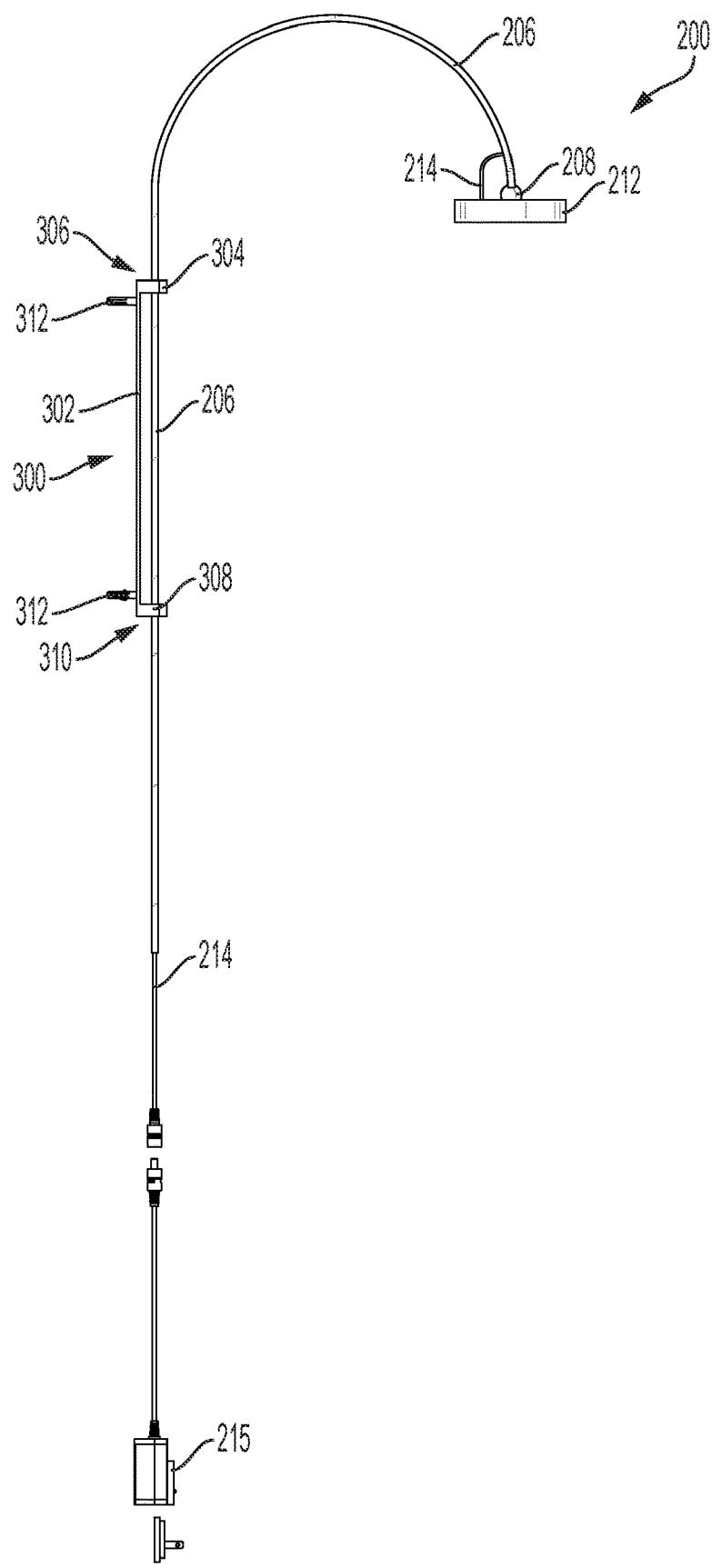
FIGS. 12 and 13 are first and second side views of the luminaire of FIG. 9.
Figure 13:
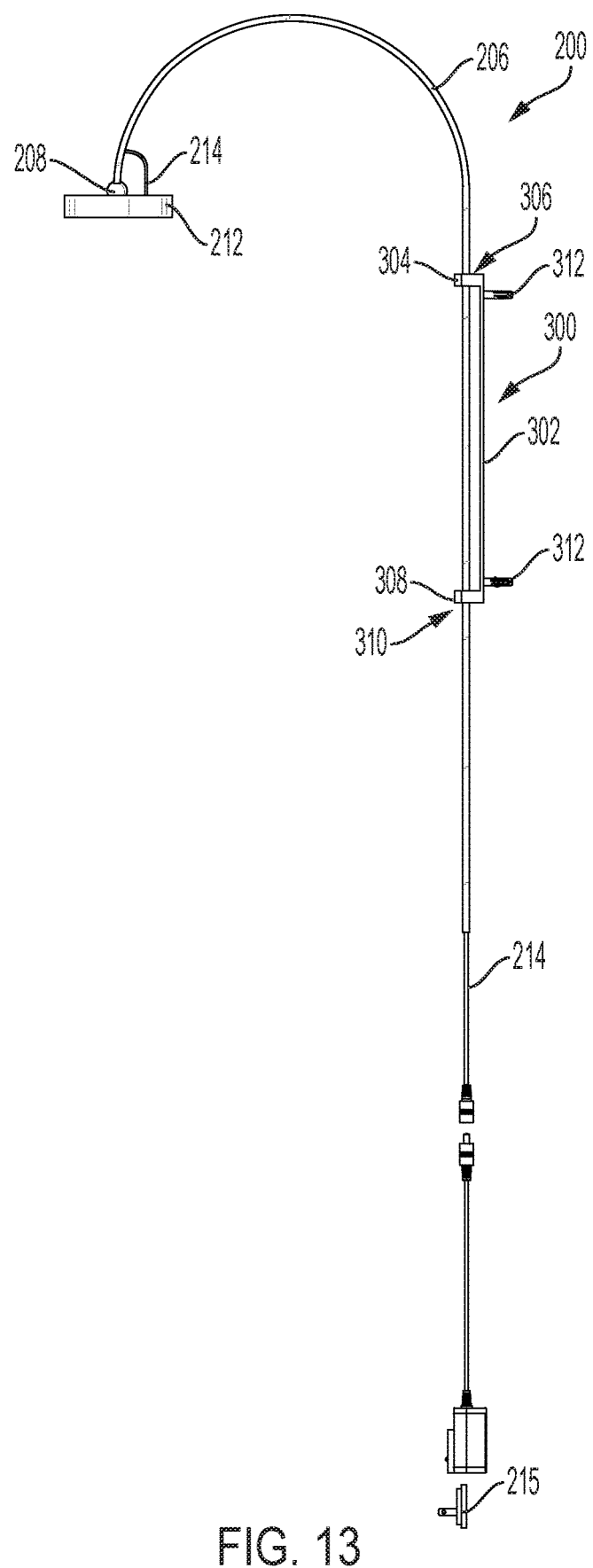

FIG. 8 illustrates a cross-sectional view of the lamp head 112 detached from the support 106 and the spherical element 108, which extends from the support 106. The lamp head 112 can be separated from the spherical element 108 by breaking a magnetic bond formed between the spherical element 108 and the magnet 172 that is arranged within the lamp head 112 while the lamp head 112 can remain tethered to the support 106 by the electrical cord 114. When the lamp head 112 is detached from the support 106, the head 112 can be a hand-held light that can manipulated by a user to direct light in a desired direction that may not have been possible when the lamp head 112 is attached to the support 106 and/or that allows for more concentrated light to illuminate a specific area. In another embodiment, the cord 114 can be retractably extendable such that when the lamp head 112 is disconnected from the spherical element 108, a user can hold the lamp head 112 in a location away from the luminaire 100 and when the user wishes to reattach the lamp head 112 to the spherical element 108, the user can retract the cord 114.

FIGS. 9-13 depict another embodiment of a luminaire 200 that includes many of the same features as the luminaire 100 described above with the exception of the base 102 and pedestal 104 as the luminaire 200 is affixable to a vertical surface (e.g., a wall) as opposed to a floor. As shown in FIGS. 9-13, the luminaire 200 includes a support or armature 206, which extends in an arc and can be flexible, a spherical element 208 attached to an end of the support 206, a lamp head 212 that is configured to receive the spherical element 208 and connect the lamp head 212 to the armature 206 and an electrical cord 214 that is fixed to the lamp head 212 and extends through the support 206 to an A/C connector 215 that can be inserted into an electrical outlet (not shown). The spherical element can, for example, be metallic, elastomeric or at least semi-elastomeric (e.g., rubberized coating). It is noted that although a spherical element 108 is shown, an element having another shape that allows for unrestricted rotation, angularity and detachability can be used. It is noted that the luminaire 200, including the lamp head 212, includes many of the same features of the luminaire 100. As such, all features of the lamp head 112 described above are the same as those included in the lamp head 212 of the luminaire 200.

To support the luminaire 200 to a surface, a bracket 300 is affixable to the support 206 and the surface. As can be seen in FIGS. 9-13, the bracket 300 includes a base 302, a first flange 304 that extends from a first end of the base 302 and includes a first through hole 306 that is configured to receive the support 206 and a second flange 308 that extends from a second end of the base 302 in a same direction as the first flange 304 and includes a second through hole 310 that is also configured to receive the support 206. To fix the bracket 300 to a surface, one or more fasteners 312 can extend through an opening or openings in the base 302 of the bracket 300 or can be fixed to the base 302 of the bracket 300 and into the surface. The flange 300 is configured to interact with the support 206 such that the support 206 is rotatable within the through holes 306, 310 to allow the luminaire 200 to be orientated at multiple positions in relation to the surface to which the luminaire 200 is mounted.

Although this invention has been disclosed in the context of certain embodiments and examples, it will be understood by those skilled in the art that the invention extends beyond the specifically disclosed embodiments to other alternative embodiments and/or uses of the invention and obvious modifications and equivalents thereof. It is to be understood that the phraseology or terminology employed herein is for the purpose of description and not of limitation. In addition, while several variations of the embodiments of the invention have been shown and described in detail, other modifications, which are within the scope of this invention, including, but not limited to, the substitutions of equivalent features, materials, or parts, will be readily apparent to those of skill in the art based upon this disclosure without departing from the spirit and scope of the invention.

What is claimed is:

1. A lighting system, comprising:
a support;
a spherical element fixed to a distal end of the support; and
a lamp head including a first housing having an opening therein and a second housing that is fixable to the first housing having an opening therein, a magnet that is arranged between the first housing and the second housing and configured to attract the spherical element such that the lamp head and the spherical element are selectively and rotatably coupleable to each other with the opening of the first housing configured for the spherical element to extend in part therethrough, a connection apparatus that is arranged between the first housing and the second housing, wherein the connection apparatus has a first side and a second side opposite the first side with the first side including a concave portion configured to contact the spherical element and the second side having at least one fastener that is configured to selectively secure the magnet to the connection apparatus and ensure the magnet is in contact with the second side of the connection apparatus, a flexible printed circuit board that includes a plurality of light emitting diodes extending about an interior surface of a sidewall of one of the first housing and the second housing and projecting light toward a center of the lamp head, the spherical element and the magnet and a light guide plate having a reflective surface that is arranged between the first housing and the second housing, concentric with the flexible printed circuit board and the plurality of light emitting diodes such that the light emitting diodes are configured to emit light toward an outer periphery of the light guide plate and be reflected by the reflective surface toward the opening in the second housing to illuminate an environment.

2. The lighting system of claim 1, further comprising a pedestal having a first end and a second end with the support fixed to and extending from the first end of the pedestal.

3. The lighting system of claim 2, further comprising a base configured to support the lighting system about a surface with the second end of the pedestal fixed to the base.

4. The lighting system of claim 2, wherein the pedestal includes a plurality of longitudinally extending posts, including a first post and a second post with the second post configured to be arranged within the first post and telescopically extend from the first post and retract within the second post.

5. The lighting system of claim 1, wherein the connection apparatus further includes at least one projection extending from the second side of the connection apparatus.

6. The lighting system of claim 5, wherein the connection apparatus includes a plurality of fasteners and a plurality of projections disposed on the second side of the connection apparatus, and wherein the plurality of projections and the plurality of fasteners are alternatively arranged on the second side of the connection apparatus.

7. The lighting system of claim 1, further comprising an electric cord that extends from the support to the lamp head and, when connected to a power source, provides power to the lamp head to allow light to be emitted therefrom.

8. The lighting system of claim 1, wherein the spherical element is comprised of steel.

9. The lighting system of claim 1, wherein the support is an armature that extends at an angle from the spherical element.

10. The lighting system of claim 1, wherein the lamp head is comprised of a housing that includes a first housing element and a second housing element that are configured to be secured to each other.

11. The lighting system of claim 1, wherein the magnet is a rare earth ring magnet.

12. The lighting system of claim 1, wherein the magnet includes a concave portion on a side of the magnet that is configured to attract the spherical element.

13. The lighting system of claim 1, wherein the at least one fasteners is a snap hook.

14. The lighting system of claim 1, further comprising a diffuser through which light projects.

15. The lighting system of claim 1, further comprising a mounting bracket configured to secure the lighting system to a surface.

\* \* \* \* \*